United States Patent
Blankenship et al.

(10) Patent No.: US 10,616,925 B2
(45) Date of Patent: Apr. 7, 2020

(54) METHODS FOR DETERMINING THE NUMBER OF REPETITIONS OF PUCCH FOR MTC UES

(71) Applicant: Telefonaktiebolaget LM Ericsson (publ), Stockholm (SE)

(72) Inventors: Yufei Blankenship, Kildeer, IL (US); Vidit Saxena, Järfälla (SE); Anders Wallén, Ystad (SE); Johan Bergman, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/073,885

(22) PCT Filed: Feb. 6, 2017

(86) PCT No.: PCT/SE2017/050107
§ 371 (c)(1),
(2) Date: Jul. 30, 2018

(87) PCT Pub. No.: WO2017/135887
PCT Pub. Date: Aug. 10, 2017

(65) Prior Publication Data
US 2019/0045552 A1    Feb. 7, 2019

Related U.S. Application Data

(60) Provisional application No. 62/292,068, filed on Feb. 5, 2016.

(51) Int. Cl.
*H04W 74/08* (2009.01)
*H04W 72/04* (2009.01)
*H04L 1/08* (2006.01)

(52) U.S. Cl.
CPC .......... *H04W 74/0833* (2013.01); *H04L 1/08* (2013.01); *H04W 72/0413* (2013.01)

(58) Field of Classification Search
CPC .. H04W 72/0413; H04W 74/0833; H04L 1/08
See application file for complete search history.

(56) References Cited

U.S. PATENT DOCUMENTS

2015/0016312 A1* 1/2015 Li .................... H04W 74/0833
                                                  370/280
2016/0165640 A1* 6/2016 Yang .................... H04W 74/08
                                                  370/336

(Continued)

FOREIGN PATENT DOCUMENTS

WO    2015116732 A1    8/2015

OTHER PUBLICATIONS

Ericsson, et al., "RP-141660: New WI proposal: Further LTE Physical Layer Enhancements for MTC," Third Generation Partnership Project (3GPP), TSG RAN Meeting #65, Sep. 9-12, 2014, 8 pages, Edinburgh, Scotland.

(Continued)

Primary Examiner — Brian D Nguyen
(74) Attorney, Agent, or Firm — Sage Patent Group

(57) ABSTRACT

The disclosure pertains to a terminal for a Radio Access Network, the terminal being adapted for transmitting Uplink Control Information, UCI. Transmitting UCI comprises repeating the UCI for a number of repetitions, the number of repetitions being determined based on a Random Access CHannel Coverage Enhancement Level, PRACH CE level. The disclosure also pertains to related methods and devices.

6 Claims, 6 Drawing Sheets

(56) References Cited

U.S. PATENT DOCUMENTS

2016/0192376 A1* 6/2016 Lee .................. H04W 48/20
370/252
2016/0381712 A1* 12/2016 Yang ................. H04W 74/08
370/329
2017/0374570 A1* 12/2017 Yi ..................... H04L 1/00

OTHER PUBLICATIONS

RAN1, "R1-157925: Reply LS on direct indication of system information update and other fields," Third Generation Partnership Project (3GPP), TSG-RAN WG1 Meeting #83, Nov. 15-22, 2015, 1 page, Anaheim, USA.
TSG RAN WG1, "RP-152024: Introduction of Rel-13 eMTC feature to LTE RAN1specs," Third Generation Partnership Project (3GPP), TSG RAN Meeting #70, Dec. 7-10, 2015, 1 page, Sitges, Spain.
Vodafone, "RP-140492: LS on Providing the IMEISV to eNB," Third Generation Partnership Project (3GPP), TSG RAN Meeting #63, Mar. 3-6, 2014, 1 page, Fukuoka, Japan.
International Search Report and Written Opinion for International Patent Application No. PCT/SE2017/050107, dated Apr. 5, 2017, 9 pages.

* cited by examiner

METHODS FOR DETERMINING THE NUMBER OF REPETITIONS OF PUCCH FOR MTC UES

This application is a 35 U.S.C. § 371 national phase filing of International Application No. PCT/SE2017/050107, filed Feb. 6, 2017, which claims the benefit of U.S. Provisional Application No. 62/292,068, filed Feb. 5, 2016, the disclosures of which are incorporated herein by reference in their entireties.

TECHNICAL FIELD

The present disclosure pertains to wireless communication technology, in particular to configuring a terminal regarding a Physical Uplink Control Channel (PUCCH).

BACKGROUND

Machine-Type Communication (MTC) has a huge potential from the operator perspective. It is efficient for operators to be able to serve MTC UE using already deployed radio access technology. Therefore, 3GPP LTE has been investigated as a competitive radio access technology for efficient support of MTC. Lowering the cost of MTC UE's is an important enabler for implementation of the concept of "internet of things". MTC UE's used for many applications will require low operational power consumption and are expected to communicate with infrequent small burst transmissions. In addition, there is a substantial market for the M2M use cases of devices deployed deep inside buildings which would require coverage enhancement in comparison to the defined LTE cell coverage footprint.

3GPP LTE Rel-12 has defined UE power saving mode allowing long battery lifetime and a new UE category allowing reduced modem complexity. In Rel-13, further MTC work is expected to further reduce UE cost and provide coverage enhancement. The key element to enable cost reduction is to introduce reduced UE RF bandwidth of 1.4 MHz in downlink and uplink within any system bandwidth.

The Rel-13 work item, "Further Physical Layer Enhancements for Machine Type Communication" [RP-140492] has agreed to provision a new UE class with RF bandwidth of 1.4 MHz for cost/complexity savings. Within a larger system bandwidth, this narrowband/low-complexity (LC) UE will be able to receive and transmit only over the UE bandwidth. The specification work is approaching finalization and the latest agreed description of the physical layer details can be found in [RP-152024] and [R1-157925].

SUMMARY

In particular in the context of MTC, the transmission of control information is subject to new demands. It is an object of the present disclosure to provide approaches allowing flexible and reliable control information flows, in particular for the uplink.

Accordingly, there is described a terminal for a Radio Access Network. The terminal is adapted for transmitting Uplink Control Information, UCI, wherein transmitting UCI comprises repeating the UCI for a number of repetitions. The number of repetitions is determined based on a Random Access CHannel Coverage Enhancement Level, RACH CE level. The terminal may comprise control or processing circuitry and/or radio circuitry, in particular a transmitter. It may be considered that the terminal is adapted to utilise the circuitry for transmitting the UCI. Alternatively or additionally, the terminal may comprise a transmitting module for transmitting the UCI.

Moreover, a method for operating a terminal in a Radio Access Network is described. The method comprises transmitting Uplink Control Information, UCI, wherein transmitting UCI comprises repeating the Uplink Control Information for a number of repetitions. The number of repetitions is determined based on a Random Access CHannel Coverage Enhancement Level, RACH CE level.

A network node for a Radio Access Network may be considered. The network node is adapted for receiving Uplink Control Information, UCI, from one or more than one terminals, the UCI being repeated for a number of repetitions. The number of repetitions is determined based on a Random Access CHannel Coverage Enhancement Level, RACH CE level. The network node may comprise control or processing circuitry and/or radio circuitry, in particular a receiver. It may be considered that the network node is adapted to utilise the circuitry for receiving the UCI. Alternatively or additionally, the network node may comprise a receiving module for receiving the UCI.

Also, a method for operating a network node in a Radio Access Network is proposed. The method comprises receiving Uplink Control Information, UCI, from one or more than one terminals, the UCI being repeated for a number of repetitions. The number of repetitions is determined based on a Random Access CHannel Coverage Enhancement Level, RACH CE level.

There is also described a program product comprising code executable by control circuitry, the code causing the control circuitry to carry out and/or control any one or any combinations of the methods described herein.

Further, there may be considered a carrier medium carrying and/or storing a program product as described herein.

According to the approaches described herein, the number of repetitions for UCI may be adapted to the coverage enhancement level, allowing improved flexibility and adaptability to different coverage scenarios.

The Radio Access Network may be a cellular network and/or utilise a specific RAT, and/or be a LTE-based network and/or E-UTRAN. A terminal may be a User Equipment, e.g. a low-cost UE and/or MTC UE. It may be considered that the network node is implemented as base station, in particular an eNodeB. UCI may comprise for example HARQ feedback, and/or measurement reporting (channel status reporting) and/or scheduling request/s.

Each repetition of UCI may comprise and/or represent the same information content (e.g., as indicated in the first UCI). Different repetitions may be send in different UCI messages or signals.

A coverage enhancement level may represent a specified level of coverage enhancement, e.g. according to a standard like LTE. Such a level may be defined based on transmission conditions and/or environmental conditions and/or use case and/or capability of a terminal.

The RACH CE level may be a physical RACH CE level, e.g. a PRACH CE level. It may be considered that the transmitting UCI comprises transmitting UCI on a PUCCH, and/or that the UCI is transmitted on a PUCCH.

BRIEF DESCRIPTION OF THE DRAWINGS

The drawings are provided to elucidated in exemplary manner the concepts and approaches described herein and are not intended to limit their scope unless specifically stated otherwise. The drawings comprise.

DETAILED DESCRIPTION

Figure 1:
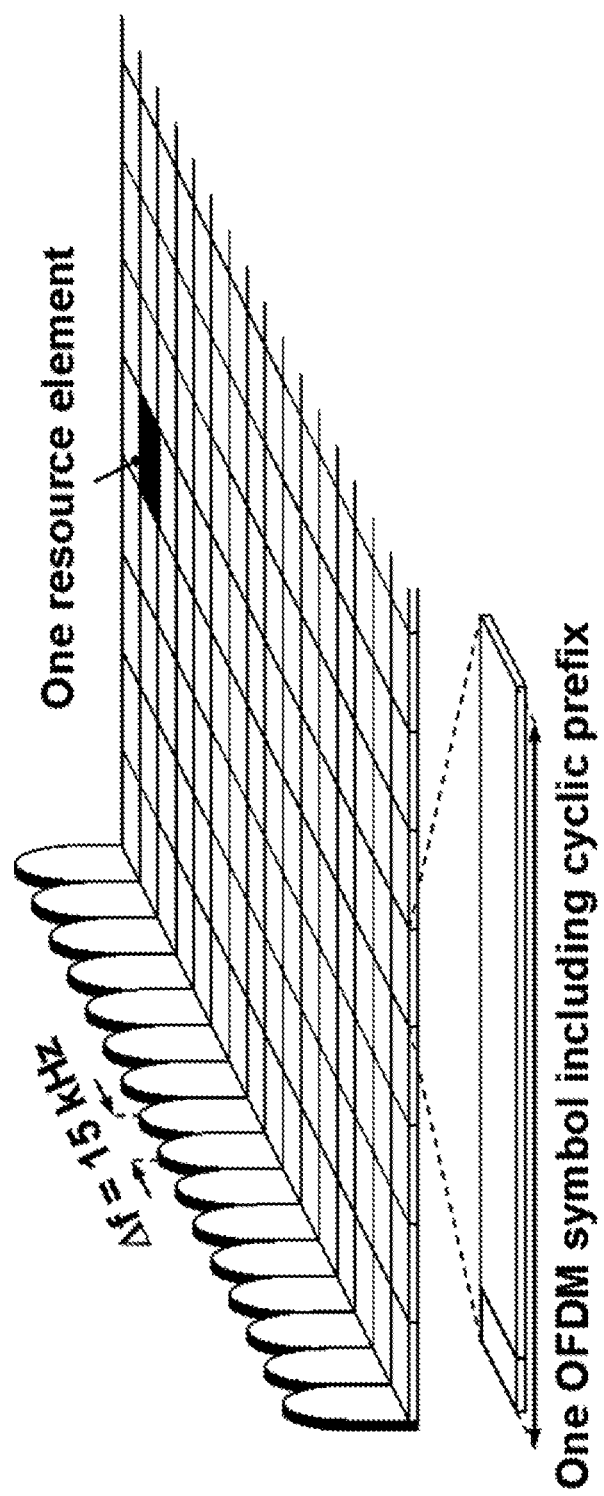
FIG. 1, showing a LTE downlink physical resource structure.

PUCCH in LTE is discussed in the following in an exemplary manner.

LTE uses hybrid-ARQ (HARQ), wherein, after receiving downlink data in a subframe, the terminal attempts to decode it and reports to the base station whether the decoding was successful (ACK) or not (NACK). In case of an unsuccessful decoding attempt, the base station can retransmit the erroneous data.

Uplink control signaling from the terminal to the base station consists of hybrid-ARQ acknowledgements for received downlink data;

terminal reports related to the downlink channel conditions, used as assistance for the downlink scheduling (channel status reports);

scheduling requests, indicating that a terminal needs uplink resources for uplink data transmissions.

Various PUCCH formats are defined to carry different type of uplink information and their combination. For example, scheduling requests, hybrid-ARQ up to for 1 or 2 bits are transmitted over the so-called PUCCH format 1, 1A or 1B respectively. CSI reports and larger number of hybrid-ARQ bits use formats 2 and 3 respectively.

If the terminal has not been assigned an uplink resource for data transmission, the uplink control signaling and/or L1/L2 control information (channel-status reports, hybrid-ARQ acknowledgments, and scheduling requests) is transmitted in uplink resources (resource blocks) specifically assigned for uplink L1/L2 control on PUCCH. These resources are located at the edges of the total available cell bandwidth.

The reasons for locating the PUCCH resources at the edges of the overall available spectrum are two-fold:

Together with the frequency hopping, this maximizes the frequency diversity experienced by the control signaling Assigning uplink resources for the PUCCH at other positions within the spectrum, i.e. not at the edges, would have fragmented the uplink spectrum, making it impossible to assign very wide transmission bandwidths to a single terminal and still retain the single-carrier property of the uplink transmission For Rel-13, low complexity MTC UEs (LC-UE or LC terminal) and UEs operating in coverage enhancement, both slots in a subframe are used for transmission of a PUCCH. At least for system BW>6 RBs (resource Blocks), slot-based hopping (within a narrowband and within a subframe) is not supported.

Rel-13 LTE supports PUCCH transmission with repetitions across multiple subframes. In order to provide frequency diversity, a MTC UE may be configured with frequency hopping according to higher layer configuration. For UEs operating coverage enhancement for PUCCH, PUCCH frequency hopping may always be used. Hopping is between two PUCCH narrowband regions which are located symmetrically at the two edges of the overall system bandwidth. PUCCH frequency location for Rel-13 low complexity UEs in enhanced coverage stays the same for at least X subframes, where X is configured by higher layer signaling (e.g. by a network node like eNodeB).

PUCCH resource determination is according to:

RRC indicates a starting offset which is defined within the whole system bandwidth; narrowband of PUCCH is implicitly determined from the starting offset; One starting offset can be defined for each CE level (or per narrowband);

Starting offsets of the PUCCH resource(s) indicated by MTC SIB (System Information Block) is configured separately per PUCCH repetition level. The starting offsets of the PUCCH resource is cell specific and PUCCH repetition level specific.

However, at the initial access stage, in particular during or at the RACH (Random Access procedure) the UE is not yet configured with the UE-specific RRC parameter "Number of PUCCH repetitions". Specifically, the RACH Msg4 is a UE-specific PDSCH (Physical Downlink Shared Channel) transmission that uses a normal HARQ procedure. The UE needs to send PUCCH in response to RACH Msg4 before receiving the UE-specific RRC parameter "Number of PUCCH repetitions". Hence, the UE does not know what value of "Number of PUCCH repetitions" to use. Additionally, without knowledge of "Number of PUCCH repetitions", the UE does not know which value of "Starting offsets of the PUCCH resource" to use in deriving PUCCH resource.

Thus there is a need to provide a method of deriving "Number of PUCCH repetitions", where the PUCCH is used to provide feedback to the RACH Msg4.

Methods solve the issue of Msg4 feedback that arises from unavailability of some PUCCH configuration parameters are proposed. This solution allows the UE to determine PUCCH configuration (i.e. number of PUCCH repetitions and PUCCH starting offset) to be used for Msg4 feedback. Since the schemes implement implicit determination for this information, there is no need for additional signaling in the uplink as well as the downlink.

This solution allows the number of PUCCH repetitions to be selected in a systematic and robust way before an RRC connection has been fully established.

Indicating by RRC may pertain to the network (in particular a network node like an eNodeB) transmitting RRC signaling (e.g., a RRC message) comprising a configuration corresponding to the information indicated.

Exemplarily, determination without regard to PRACH CE level is discussed in the following.

RACH procedure starts with PRACH transmission from the CE. Several variants are possible for deriving "Number of PUCCH repetitions" for PUCCH associated with RACH Msg4, where it is not conditioned on the PRACH CE level chosen by the UE.

An exemplary Option A based on actual number of repetitions of the PUSCH is discussed in the following.

Use, as a reference point, the number of repetitions of the PUSCH carrying RACH Msg3. That is, "Number of PUCCH repetitions" is initially derived based on the "Number of Repetitions for Msg3 PUSCH" field in Random Access Response Grant.

Pros: PUSCH and PUCCH both are UL transmission and part of the RACH procedure. In contrast, the downlink typically has different interference characteristics compared to the uplink, and the number of MPDCCH/PDSCH repetitions might not be very accurate in the uplink.

Cons: Number of bits carried by PUSCH is much larger than that of PUCCH and the two channels use different channel coding, meaning that they have somewhat different link performance characteristics.

One example of mapping from "Number of repetitions for PUSCH" to "Number of PUCCH repetitions" is shown in Table 1. Since the actual number of repetitions of the PUSCH can be non-consecutive numbers signaled by the MPDCCH, the mapping table takes as input distinct integer numbers.

TABLE 1

Possible mapping using Number of repetitions of a data channel.

| Number of repetitions of a data channel | "Number of PUCCH repetitions" for PUCCH in response to Msg4 |
|---|---|
| 1, 2 | 1 |
| 4, 8 | 2 |
| 16, 32, 64 | 4 |
| 128, 192, 256 | 8 |
| 384, 512, 768 | 16 |
| 1024, 1536, 2048 | 32 |

To determine an appropriate number of PUCCH repetitions from the number of repetitions of data channel, the TBS/MCS index of data channel may also be considered. For a given number of data channel repetitions, a higher MCS/TBS index (i.e. large data packet) would imply that relatively fewer PUCCH repetitions are required. An example mapping is provided in the table below. Here 'MCS/TBS index 0-7' corresponds to the lowest MCS/TBS values and 'MCS/TBS index 8-15' corresponds to the highest MCS/TBS values. It is also possible to use the TBS value (in number of bits) instead of the MCS/TBS index.

| Number of repetitions of a data channel [MCS/TBS index 0-7] | Number of repetitions of a data channel [MCS/TBS index 8-15] | "Number of PUCCH repetitions" for PUCCH in response to Msg4 |
|---|---|---|
| 1, 2 | 1, 2, 4 | 1 |
| 4, 8 | 8, 16, 32 | 2 |
| 16, 32, 64 | 64, 128, 192 | 4 |
| 128, 192, 256 | 256, 384, 512 | 8 |
| 384, 512, 768 | 768, 1024 | 16 |
| 1024, 1536, 2048 | 1536, 2048 | 32 |

An exemplary Option B based on actual number of repetitions of the MPDCCH is discussed in the following.

Use, as a reference point, the actual number of repetitions of the MPDCCH which scheduled Msg4. That is, Step 1: use the "DCI subframe repetition number" field carried in the DCI to determine the $R_{MPDCCH}$ of DCI;

Step 2. Use $R_{MPDCCH}$ of DCI to look up "Number of PUCCH repetitions". One example of the look-up table is shown in Table 2.

Since the actual number of repetitions of the MPDCCH can be any integer numbers up to (and including) the maximum $R_{MPDCCH,RAR,max}$, the mapping table takes as input any integer numbers.

The MPDCCH used in this method is one of the downlink control channels that may be used before the RACH Msg4 is received. For example, the variations of Option B include:

Use the actual number of repetitions of the MPDCCH which scheduled RAR.

RAR contains information that schedules the Msg3 (UL transmission).

Use the actual number of repetitions of the MPDCCH which scheduled Msg4.

It should be noted that MTC-SIB may explicitly provide $R_{MPDCCH,RAR,max}$ for CSS of RAR, Msg3, and Msg4. The UE obtains the actual number of repetitions used for MPDCCH of RAR, Msg3, and Msg4, respectively, via blind decoding MPDCCH. After successful decoding of the MPDCCH candidate, the DCI field "DCI subframe repetition number" then contains the actual number of MPCCH repetitions, which is less than or equal to $R_{MPDCCH, RAR,max}$;

TABLE 2

Possible mapping using Number of repetitions of a downlink control channel.

| Number of repetitions of a downlink control channel | "Number of PUCCH repetitions" for PUCCH in response to Msg4 |
|---|---|
| =1 | 1 |
| =2 | 2 |
| <=4 | 4 |
| <=16 | 8 |
| <=64 | 16 |
| <=256 | 32 |

An exemplary Option C based on the maximum number of repetitions of the MPDCCH is discussed in the following.

Use, as a reference point, the max number of repetitions of the MPDCCHs which schedules RAR/Msg4, $R_{MPDCCH, RAR,max}$. RAR and Msg4 are two consecutive DL messages in RACH procedure, and their MPDCCH use the same $R_{MPDCCH, RAR,max}$. $R_{MPDCCH, RAR,max}$ is provided to the UE via the "mPDCCH-NumRepetition-RA" field carried in SIB of RRC signaling. The "mPDCCH-NumRepetition-RA" field is Cell specific and PRACH CE level specific.

TABLE 3

Possible mapping using Number of repetitions of a downlink control channel.

| Configured maximum number of repetitions of a downlink control channel | "Number of PUCCH repetitions" for PUCCH in response to Msg4 |
|---|---|
| 1 | 1 |
| 2 | 2 |
| 4 | 4 |
| 8, 16 | 8 |
| 32, 64 | 16 |
| 128, 256 | 32 |

An exemplary Option D based on actual number of repetitions of the PDSCH is discussed in the following.

Use, as a reference point, the number of repetitions of the PDSCH carrying RACH Msg4. That is, "Repetition number" field contained in either DCI format 6-1A or format 6-1 B, where DCI format 6-1A is used for PRACH CE level 0 and 1, and DCI format 6-1 B is used for PRACH CE level 2 and 3.

Since the set of "Number of repetitions for PDSCH" is the same as the set of "Number of repetitions for PUSCH", this Option can use Table 1 as the mapping Table as well.

Pros: These PDSCH and PUCCH both are related to Msg4, where PDSCH carries Msg4, and PUCCH carries the HARQ-ACK response to Msg4. The link adaptation algorithm in eNodeB may have adapted the "Number of repetitions for PDSCH" to reflect the channel condition the UE experiences.

Cons: PDSCH experience the DL channel condition, which can be quite different from the UL channel condition. Also, the number of bits carried by PDSCH is much larger than that of PUCCH and the two channels use different channel coding, meaning that they have somewhat different link performance characteristics.

Exemplarily, determination with regard to PRACH (Physical Random Access CHannel) CE level is discussed in the following.

Several variants are possible for deriving "Number of PUCCH repetitions" for PUCCH associated with RACH Msg4, where it is conditioned on the PRACH CE level chosen by the UE. Define "Number of PUCCH repetitions" for response to Msg4 separately according to the PRACH CE level used in the last PRACH attempt. For (a) PRACH CE level 0 or 1, use number of repetitions according to CE mode A; and for (b) PRACH CE level 2 or 3, use number of repetitions according to CE mode B.

Possible mapping according to last PRACH CE (Coverage Enhancement) level used in the RACH procedure includes:

In case PRACH CE level 0 or 1 is used for the last PRACH attempt,

The set of parameters are based on CE mode A, i.e., "Number of PUCCH repetitions" value range={1,2,4, 8};

In case PRACH CE level 2 or 3 is used for the last PRACH attempt

The set of parameters are based on CE mode B, i.e., "Number of PUCCH repetitions" value range={4,8,16, 32};

For each of the Options listed, the mapping table can be adjusted to take into account of the PRACH CE level. Below, the consideration is illustrated using Option A.

For PRACH CE level 0 or 1:

| Max Number of repetitions of PUSCH in CE Mode A | "Number of PUCCH repetitions" for PUCCH in response to Msg4 |
|---|---|
| Max number of repetitions of PUSCH = 8, actual number of repetitions of PUSCH carrying Msg 3 is either 1 or 2 | 1 |
| Max number of repetitions of PUSCH = 8, actual number of repetitions of PUSCH carrying Msg 3 is either 4 or 8 | 2 |
| 16 | 4 |
| 32 | 8 |

For PRACH CE level 2 or 3:

| Max Number of repetitions of PUSCH in CE Mode B | "Number of PUCCH repetitions" for PUCCH in response to Msg4 |
|---|---|
| 192, 256 | 4 |
| 384, 512 | 8 |
| 768, 1024 | 16 |
| 1536, 2048 | 32 |

Exemplarily, determination based on a combination of criteria is described.

The number of PUCCH repetitions in response to Msg4 can be based on any of the options presented above separately, or it can be selected as a combination of two or more of the criteria. As a non-limiting example, tentative repetitions numbers can be evaluated based on two or more of the criteria above, and the number of PUCCH repetitions in response to Msg4 can then be selected as the maximum value of the tentative repetition numbers. Since different criteria may capture different signs of repetition needs, the use of maximum may increase robustness. Alternatives to using the maximum value can be to use the minimum, mean or median value (respectively a rounded or truncated number thereof).

In addition to the criteria described above, also alternative number determining criteria can be used that are not explicitly related to the number of repetitions used for other physical channels. As non-limiting examples, these alternative number determining criteria can be based on one or more of the following metrics related to the cell associated with the current RACH procedure:

A signal strength indication, such as e.g. the RSRP (Reference Signal Received Power), A signal quality indication, such as e.g. the RSRQ (Reference Signal Received Quality), An estimated pathloss metric, PL, The number of received Primary and/or Secondary Synchronization Signal transmissions accumulated to successfully detect the cell, The number of received PBCH (Physical Broadcast Channel) transmissions used to successfully decode the PBCH from the cell, The maximum transmit power of the UE, and/or the used transmit power of the eNB.

Corresponding criteria may for example associate an RSRP value larger than a first threshold and/or smaller than a second threshold with a given number of PUCCH repetitions. Any number of such criteria can be used for any of the above mentioned (or similar) metrics.

Furthermore, the use of these metrics can be combined with the earlier described options for selecting the number of PUCCH repetitions. As a non-limiting example, the number of PUCCH repetitions R in response to Msg4 may be selected such that a first number of repetitions is used if the RSRP is larger than a threshold, otherwise it is determined according to any of the options presented above related to the number of repetitions used for other physical channels.

Determination in different RRC states is described.

The described variants are primarily intended for cases when a UE carries out a contention-based random access in RRC_IDLE state but the variants may also be used for cases when a UE carries out a contention-based or contention-free random access in RRC_CONNECTED state. In RRC_CONNECTED mode the UE may already be configured with a UE-specific number of repetitions for PUCCH that may also be used for random access related PUCCH transmissions, but in case this setting is considered outdated or unsuitable for some other reason, the number of repetitions for PUCCH can be determined according to the described variants instead.

Generally, there may be considered a method for operating a terminal, which may be a LC terminal or UE, and/or a corresponding terminal may be considered. The method may comprise, and/or the terminal may be adapted for, and/or comprise a transmitting module for, transmitting uplink control information (UCI), e.g. in a subframe as described herein, and/or on an Uplink Control Channel. Transmitting uplink control information may be in response to a P/RACH message, in particular to P/RACH message 4 (msg4), and/or may be on a PUCCH. Transmitting the UCI may comprise repeating the UCI for a number of repetitions. The number of repetitions may be determined implicitly, and/or without and/or before utilizing and/or receiving signaling explicitly indicating the number of repetitions (in particular for PUCCH transmission).

The number of repetitions may be based on the number of repetitions of signals received and/or transmitted and/or configured for at least one other channel (in particular physical channel) different from PUCCH, which may be a channel to the network node receiving and/or terminating and/or being targeted or addressed by the PUCCH.

The other channel may be used for and/or be configured for using uplink and/or downlink signals before the msg4 and/or Uplink Control Channel control information or a corresponding Uplink Control Channel configuration explicitly configuring the number of repetitions for the UCI is received by the terminal. The at least one other channel may comprise an uplink and/or downlink channel. It may be considered that the at least one other channel comprises a data transmission channel, e.g. PUSCH and/or PDSCH, and/or a control channel, e.g. a Physical Downlink Control Channel (PDCCH), in particular a MTC-PDCCH, which may be defined specifically for MPDCCH and used for the RA procedure, in particular for msg4.

Alternatively or additionally, the number of repetitions for the Uplink Control Information and/or the Uplink Control Channel may be (e.g., implicitly) determined based on the RACH CE level, which may be signaled to the terminal (and/or received by the terminal, which may be adapted for such receiving and/or comprise a corresponding CE level receiving module) e.g. on a broadcast channel and/or during the RA procedure. Determining the number of repetitions may be based on a mapping between a number of repetitions configured for uplink transmission and/or configured for and/or received for downlink signals, and the number of repetitions to be used for the UCI and/or the (P) UCCH. It is to be noted that generally information or signals transmitted on an Uplink Control Channel (UCCH, in particular a Physical UCCH, PUCCH) may be considered Uplink Control Information, UCI. A Physical Channel may be a channel physically carrying information and/or signals between a terminal and the network node (or vice versa).

The number of repetitions for the UCI may be used for UCI transmissions in lieu of, and/or until, an explicit configuration of the number of repetitions is received, e.g. after the last (currently valid) msg4 of the last (current) RA procedure has been received.

Yet alternatively or additionally, the number of repetitions for the UCI and/or the Uplink Control Channel may be determined based on the alternative number determining criteria described herein.

The terminal may generally be adapted to perform, and/or comprise a terminal random access module to perform, and/or perform as part of the method, a Random Access procedure and/or the terminals side or part of a Random Access procedure. The Random Access procedure may comprise transmitting a msg1 and/or msg3, and/or receiving a msg2 and/or msg4; a msg3 may be transmitted in response to and/or based on a msg2.

There may generally considered a method for operating a network node, and/or a network node adapted for, and/or comprising a configuring module for, configuring one or more terminals (which may be terminals as described herein) for transmitting uplink control information as described herein.

Alternatively or additionally, there may be considered method for operating a network node comprising, and/or a network node adapted for, and/or comprising a receiving module for, receiving uplink control information from one or more than one terminals as described herein, in particular to receive the number of repetitions as determined herein. The network node, and/or the receiving module of the network node, may be adapted to receive on a narrow bandwidth as described herein. The method may comprise, and/or the network node may be adapted for, and/or comprise a processing module for, processing the received uplink control information.

Such processing may include determining the number of repetitions the terminal is expected to transmit (e.g., based on a configuration and/or pre-defined information, which may be stored in a memory accessible to the network node and/or corresponding control circuitry) and/or determining the number of repetitions actually received (e.g., within a predetermined time interval after the msg4), e.g. based on measurement.

Processing may comprise comparing these numbers. A predetermined time interval may be defined by a standard, and/or based on operational conditions, e.g. the number of terminals in communication with the network node (or being in RRC connected and/or RRC idle in regard to the network node) and/or channel status, e.g. channel quality.

The processing may comprise configuring the terminal based on the determined number/s and/or the comparing. The network node may be adapted to perform, and/or perform as part of the method, and/or comprise a random access module for performing, a Random Access procedure (respectively, the network/network node part or side of such a procedure), which may comprise transmitting a msg4 on a Random Access Channel (RACH), e.g. in response or continuation of one or more messages from the terminal, e.g. in response to a msg1 and/or Msg 3, and/or in continuation of a msg2 transmitted by the network node.

A Random Access procedure (respectively the terminal and/or network node side/s or part/s) may be according to a standard, in particular according to LTE and/or an LTE-based or related standard.

A msg1 may generally comprise a RACH preamble selected by the terminal as well as an identity indication (terminal ID, e.g. a RA-RNTI, a Radio Network Temporary Identity which may be chosen by the terminal), and/or indicate that the terminal wants to access the network via the network node. Msg1 may be transmitted on the RACH.

A msg2 may comprise or be a "Random Access Response", which may comprise access information provided by the network or network node, e.g. a Temporary C-RNTI (Cell Radio Network Temporary Identity) for further communication and/or a Timing Advance Value, e.g. for compensating for the round trip delay between terminal and network node and/or an Uplink Grant Resource, a resource initially assigned to the terminal (e.g., for UL-SCH, the Uplink Shared CHannel). Msg2 may be transmitted on a D-SCH (Downlink Shared Channel)

A msg3 may considered a connection request message, in particular implemented as a RRC connection request message. It may comprise or refer to the C-RNTI and be transmitted on the UL-SCH, e.g. utilizing resources assigned by msg2. It may comprise a more detailed UE identity (e.g., Temporary Mobile Subscriber Identity, TMSI, or Random Value) and/or a Connection establishment cause, why or for which purpose the terminal wants to access the network via the network node.

A msg4 may be a response to msg3 and be considered a contention resolution message. Msg4 may be addressed to the TMSI value or Random number provided by msg3. It may comprise a new C-RNTI to be used for further communication. Transmitting the UCI may generally be associated to this C-RNTI and/or be in response to the msg4.

The Random Access procedure may in particular be contention-based. However, a msg4 may indicate contention-free access in some scenarios or configurations; in these cases, the number and/or nature of messages (msg1 to msg3) exchanged before the msg4 may be different. In particular, some of the messages, in particular msg2 and/or msg3 may be omitted.

In this disclosure, the terms base station and network node may be freely interchanged, unless explicitly stated otherwise. A network node may in particular be a radio node. Any device providing the functionality of a network node described herein may be considered a network node or base station. However, a network node or base station may provide additional functionality, in particular control and/or scheduling functionality. A terminal may be any kind of user equipment (UE), and may be considered a terminal if it provides the functionality associated to a terminal described herein.

LTE uses OFDM in the downlink and DFT-spread OFDM in the uplink. The basic LTE downlink physical resource can thus be seen as a time-frequency grid as illustrated in FIG. 1, where each resource element corresponds to one OFDM subcarrier during one OFDM symbol interval.

FIG. 1 shows a LTE downlink physical resource structure.

In the time domain, LTE downlink transmissions are organized into radio frames of 10 ms, each radio frame consisting of ten equally-sized subframes of length $T_{subframe}=1$ ms. Each subframe is divided into two slots, each of which may comprise a number of symbols, e.g. 7 (each symbol having a symbol time length).

Figure 2:
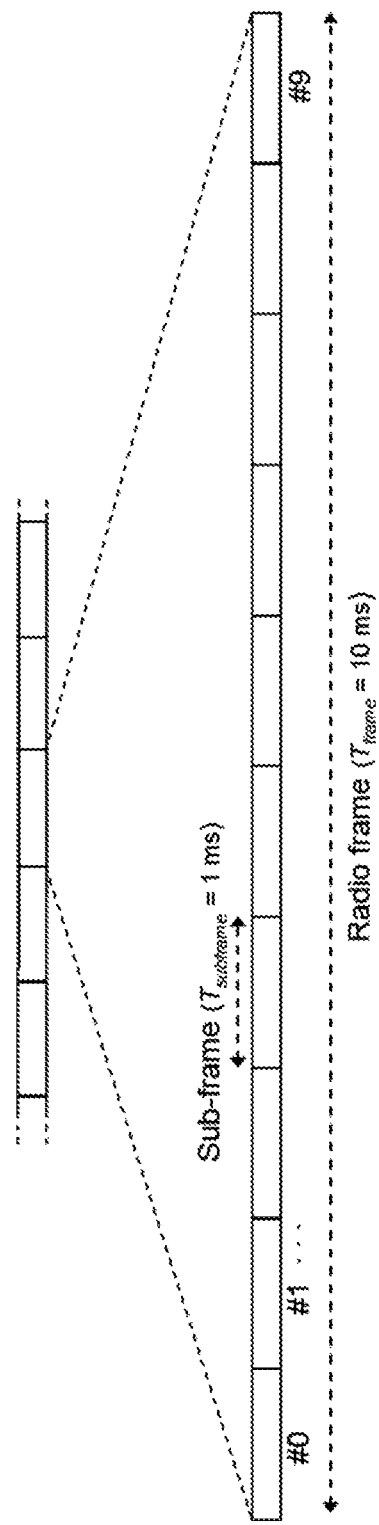
FIG. 2, showing the LTE time-domain structure.

FIG. 2 shows the LTE time-domain structure.

Furthermore, resource allocation is typically described in terms of resource blocks (RBs, in particular physical resource blocks, PRBs), where a resource block for LTE for example corresponds to one slot (0.5 ms) in the time domain and 12 contiguous subcarriers in the frequency domain. Resource blocks are numbered in the frequency domain, starting with 0 from one end of the system bandwidth.

Downlink transmissions are dynamically scheduled, i.e., in each subframe (or a pre-defined control interval) the base station transmits control information and/or allocation data (in particular downlink-related data) pertaining to scheduling, in particular downlink scheduling, which may pertain to which terminals data is to be transmitted and/or in which resource blocks the data is to be transmitted, in the current downlink subframe. This control signaling is typically transmitted in the first 1, 2, 3 or 4 OFDM symbols in each subframe. A downlink system with 3 OFDM symbols as control is illustrated in FIG. 3.

Figure 3:
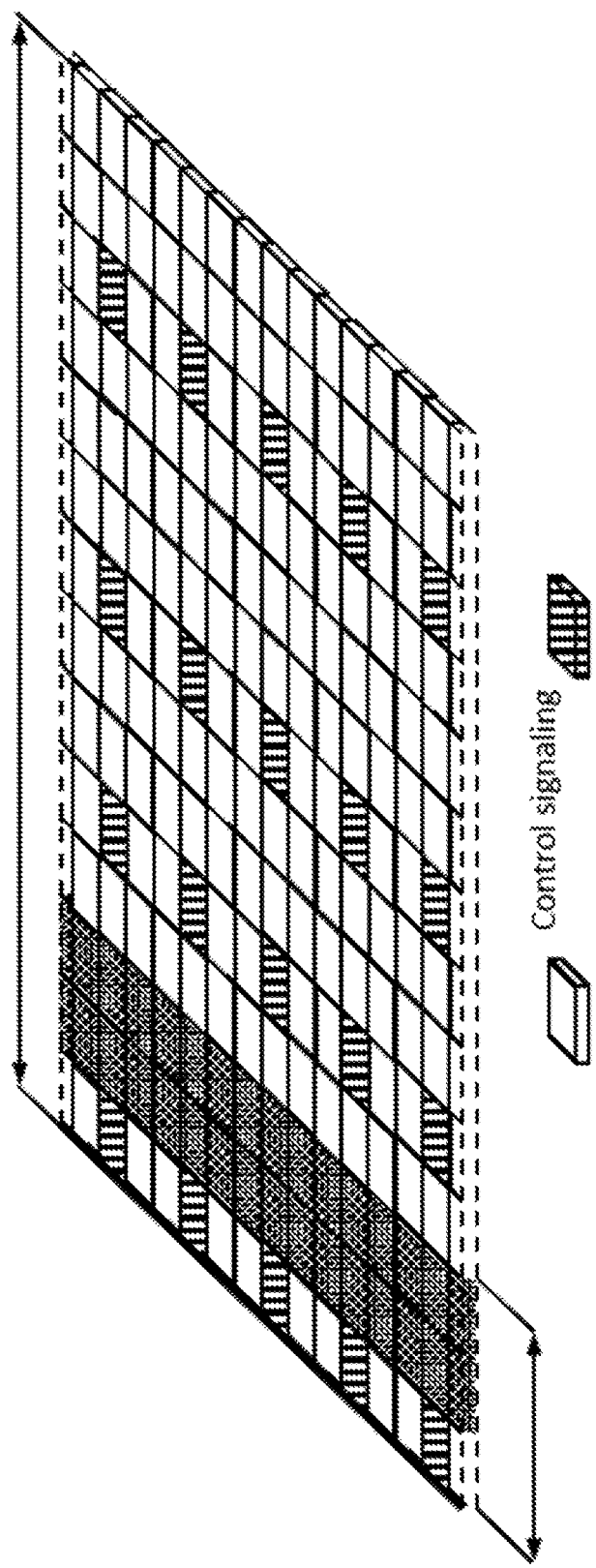
FIG. 3, showing an exemplary downlink subframe.

FIG. 3 shows an example downlink subframe.

LTE uses hybrid-ARQ (HARQ), where, after receiving downlink data in a subframe, the terminal attempts to decode it and reports to the base station whether the decoding was successful (ACK) or not (NAK). In case of an unsuccessful decoding attempt, the base station can retransmit the erroneous data. For this process, HARQ-identifiers may be utilized, which may be individually assigned to blocks of data undergoing transmission, and may be reused after a block has been identified and/or signaled (by the terminal) to be successfully transmitted (ACK).

Uplink control information, in particular uplink control signaling from the terminal to the base station, may generally comprise
  hybrid-ARQ signaling, e.g. acknowledgements/NAKs, for received downlink data; and/or
  terminal reports related to downlink channel conditions, e.g. used as assistance for the downlink scheduling, e.g., measurement reports or reports based on measurements, e.g. pertaining to CSI/CQI; and/or
  scheduling requests, e.g. indicating that a terminal request and/or needs uplink resources, e.g. for uplink data transmissions.

If the terminal has not been assigned an uplink resource for data transmission, the L1/L2 control information (channel-status reports, hybrid-ARQ acknowledgments, and scheduling requests) may be transmitted in uplink resources (resource block/s) specifically assigned for uplink L1/L2 control on PUCCH.

Figure 4:
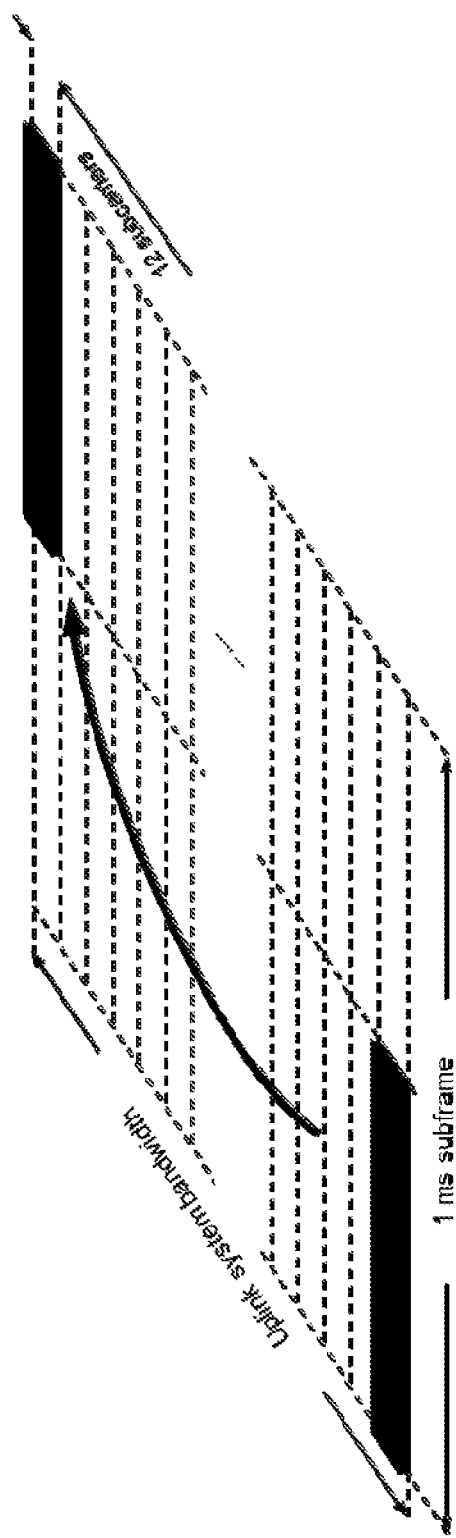
FIG. 4, showing uplink L1/L2 control signaling transmission on PUCCH.

As illustrated in FIG. 4, these resources are located at the edges of the total available resource or carrier or cell bandwidth (the frequency bandwidth assigned or associated to a resource, e.g. resource block, and/or cell and/or carrier, which may be defined by the subcarrier arrangement within a carrier and/or cell and/or resource block).

Each such resource may, e.g. in LTE, consist of twelve "subcarriers" (one resource block) within each of the two slots of an uplink subframe. In order to provide frequency diversity, these frequency resources are subjected to frequency hopping on the slot boundary, e.g., one "resource" consists of 12 subcarriers at the upper part of the spectrum within the first slot of a subframe and an equally sized resource at the lower part of the spectrum during the second slot of the subframe or vice versa. If more resources are needed for the uplink L1/L2 control signaling, e.g. in case of very large overall transmission bandwidth supporting a large number of users and/or carriers, additional resources blocks can be assigned next to the previously assigned resource blocks.

The bandwidth of one resource block during one subframe often is too large for the control signaling needs of a single terminal. Therefore, to efficiently exploit the resources set aside for control signaling, multiple terminals can share the same resource block. This may be done by assigning the different terminals different orthogonal phase rotations of a cell-specific length-12 frequency-domain sequence. A linear phase rotation in the frequency domain is equivalent to applying a cyclic shift in the time domain. Thus, although the term "phase rotation" is used herein, the term cyclic shift is sometimes used with an implicit reference to the time domain.

The resource used by a PUCCH is therefore not only specified in the time-frequency domain by the resource-block pair, but may also be specified by the phase rotation applied. Similar to the case of reference signals, e.g. in LTE, there are up to twelve different phase rotations specified, providing up to twelve different orthogonal sequences from each cell-specific sequence. However, in the case of frequency-selective channels, not all the twelve phase rotations can be used if orthogonality is to be retained. Typically, up to six rotations are considered usable in a cell. FIG. 4 shows uplink L1/L2 control signaling transmission on PUCCH.

As mentioned above, uplink L1/L2 control signaling may include hybrid-ARQ acknowledgements, channel-status reports and/or scheduling requests. Scheduling requests or hybrid-ARQ feedback consisting of 1 or 2 bits may be transmitted over the so-called PUCCH format 1, 1A or 1B respectively. CSI reports and larger number of hybrid-ARQ bits may use formats 2 and 3 respectively.

Hybrid-ARQ acknowledgements are used to acknowledge the reception of one (or two in case of spatial multiplexing, the HARQ-identifiers of which may be interlinked) transport blocks in the downlink.

A PUCCH format 1A/1B resource, used for hybrid-ARQ acknowledgement, may be represented by a single scalar resource index. From the index, the physical resources in each slot, phase rotation and the orthogonal cover sequences are derived or derivable.

As mentioned above, a PUCCH resource can be represented by an index. For hybrid-ARQ transmission, the resource index to use for transmission of the hybrid-ARQ acknowledgement is given implicitly by the downlink control signaling used to schedule the downlink transmission to the terminal. Thus, the resources to use for an uplink hybrid-ARQ acknowledgement vary dynamically and depend on the downlink control channel used to schedule the terminal in each subframe.

In addition to dynamic scheduling by using the PDCCH, there is also the possibility to semi-persistently schedule a terminal according to a specific pattern. In this case the configuration of the semi-persistent scheduling pattern includes information on the PUCCH index to use for the hybrid-ARQ acknowledgement.

Thus, to summarize, PUCCH format 1A/1B resources may be split into two parts:

A semi-static part, used for scheduling requests and hybrid-ARQ acknowledgements from semi-persistently users. The amount of resources used for the semi-static part of PUCCH 1A/1B resources does not vary dynamically.

A dynamic part, used for dynamically scheduled terminals. As the number of dynamically scheduled terminals varies, the amount of resources used for the dynamic PUCCHs varies.

Within the Rel-13 work item on "Further LTE Physical Layer Enhancements for Machine Type Communications" [3GPP Tdoc RP-141660] it has been agreed to provision a new UE class with RF bandwidth of 1.4 MHz (supporting a channel bandwidth of 6 PRBs à 180 kHz) for cost/complexity savings. Within a larger system bandwidth than 1.4 MHz, this narrowband and/or low-complexity (LC) UE (also referred to as terminal or LC terminal in the following) will or has to be able to receive and transmit only over the narrower UE bandwidth. To transmit over a different part of the system bandwidth, the UE may need to retune the center frequency of its radio circuitry and/or receiver and/or transmitter (or corresponding circuitry). During the so-called "frequency retuning time", the UE will not be able to receive/transmit any signal. The frequency retuning time is expected to be at least in the order of one OFDM symbol and maybe as high as one slot (0.5 ms).

As discussed above, the current PUCCH formats may use PRB resources located close to system bandwidth edges within each subframe. If a LC UE reuses the existing PUCCH resource allocation scheme, it will require frequency tuning at the slot boundary during which time it will not transmit anything. Thus only the latter few OFDM symbols will be transmitted in the second slot, which may cause decoding problems at the network node, e.g. eNodeB.

It is noted that while a terminal/UE bandwidth may be assumed to be 6 PRB in size, this is only an example and other sizes are possible. For example, the UE bandwidth may be 4 PRB in size, 5 PRB in size, etc. The bandwidth of a PRB may be determined according to a standard, e.g. LTE.

Figure 5:
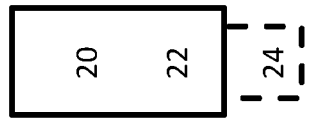
FIG. 5, schematically showing an exemplary terminal.

FIG. 5 schematically shows a terminal 10, which may be implemented in this example as a user equipment. Terminal 10 comprises control circuitry 20, which may comprise a controller connected to a memory. Any of the modules of a terminal described herein may be implemented in and/or executable by, the control circuitry 20, in particular as module in the controller. Terminal 10 also comprises radio circuitry 22 providing receiving and transmitting or transceiving functionality, the radio circuitry 22 connected or connectable to the control circuitry. An antenna circuitry 24 of the terminal 10 is connected or connectable to the radio circuitry 22 to collect or send and/or amplify signals. Radio circuitry 22 and the control circuitry 20 controlling it are configured for cellular communication with a network, in particular utilizing E-UTRAN/LTE resources as described herein. The terminal 10 may be adapted to carry out any of the methods for operating a terminal disclosed herein; in particular, it may comprise corresponding circuitry, e.g. control circuitry. Modules of a terminal as described herein may be implemented in software and/or hardware and/or firmware in corresponding circuitry. Terminal 10 may in particular a MTC-UE or MTC-terminal or a LC UE or LC terminal.

Figure 6:
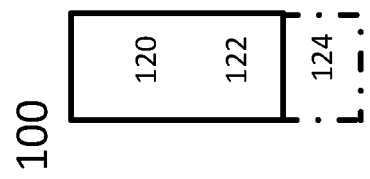
FIG. 6, schematically showing an exemplary network node or base station 100.

FIG. 6 schematically show a network node or base station 100, which in particular may be an eNodeB. Network node 100 comprises control circuitry 120, which may comprise a controller connected to a memory. The control circuitry is connected to control radio circuitry 122 of the network node 100, which provides receiver and transmitter and/or transceiver functionality. An antenna circuitry 124 may be connected or connectable to radio circuitry 122 for signal reception or transmittance and/or amplification. The network node 100 may be adapted to carry out any of the methods for operating a network node disclosed herein; in particular, it may comprise corresponding circuitry, e.g. control circuitry. Modules of a network node as described herein may be implemented in software and/or hardware and/or firmware in corresponding circuitry.

Both terminal 10 and network node 100 may be adapted to perform a Random Access procedure as described herein, in particular to exchange the messages (msg1 to msg4) described herein.

Some useful abbreviations comprise
CCE Control channel element
CE Coverage enhanced/enhancement
DCI Downlink control information
EPDCCH Enhanced physical downlink control channel
LC Low cost/complexity
MTC Machine type communications
PDSCH Physical downlink shared channel
PRB Physical resource block
PUCCH Physical uplink control channel
3GPP 3rd Generation Partnership Project
Ack/Nack Acknowledgment/Non-Acknowledgement, also A/N
AP Access point Bandwidth of signals, in particular carrier bandwidth Bn assigned to B1, B2, . . . Bn corresponding carrier or frequency f1, f2, . . . , fn BER/BLER Bit Error Rate, BLock Error Rate;
BS Base Station
CA Carrier Aggregation
CCA Clear Channel Assessment
CIS Transmission Confirmation Signal
CoMP Coordinated Multiple Point Transmission and Reception
CQI Channel Quality Information
CRS Cell-specific Reference Signal
CSI Channel State Information
CSI-RS CSI reference signal
D2D Device-to-device
DCI Downlink Control Information
DL Downlink
DL Downlink
  Downlink; generally referring to transmission of data to a node/into a direction further away from network core (physically and/or logically); in particular from base station or eNodeB terminal; more generally, may refer to transmissions received by a terminal or node (e.g. in a D2D environment); often uses specific spectrum/bandwidth different from UL (e.g. LTE)
DMRS Demodulation Reference Signals
DRS Discovery Reference Signal
eNB evolved NodeB, base station
eNB evolved NodeB; a form of base station, also called eNodeB
EPDCCH Enhanced Physical DL Control CHannel
E-UTRA/N Evolved UMTS Terrestrial Radio Access/Network, an example of a RAT
HARQ Hybrid Automatic Repeat reQuest
ID Identity
L1 Layer 1
L2 Layer 2
LA Licensed Assisted
LA Licensed Assisted Access
LBT Listen-before-talk
LTE Long Term Evolution, a telecommunications standard
MAC Medium Access Control
MBSFN Multiple Broadcast Single Frequency Network
MCS Modulation and Coding Scheme
MDT Minimisation of Drive Test
NW Network
O&M Operational and Maintenance
OFDM Orthogonal Frequency Division Multiplexing
OSS Operational Support Systems
PC Power Control
PCFICH Physical Control Format Indicator Channel
PDCCH Physical Downlink Control Channel
PDCCH Physical DL Control CHannel
PH Power Headroom
PHR Power Headroom Report
PMI Precoding Matrix Indicator
PRB Physical Resource Block
PSS Primary Synchronization Signal
PUCCH Physical Uplink Control Channel
PUSCH Physical Uplink Shared Channel
PUSCH Physical Uplink Shared CHannel
RA Random Access
RACH Random Access CHannel
RAT Radio Access Technology
RB Resource Block
RE Resource Element
RI Rank Indicator
RRC Radio Resource Control
RRH Remote radio head
RRM Radio Resource Management
RRM Radio Resource Management
RRU Remote radio unit
RSRP Reference signal received power
RSRQ Reference signal received quality
RSSI Received signal strength indicator
RX reception/receiver, reception-related
SA Scheduling Assignment
SCell Secondary Cell
SFN Single Frequency Network
SINR/SNR Signal-to-Noise-and-Interference Ratio; Signal-to-Noise Ratio
SON Self-Organizing Network
SR Scheduling Request
SRS Sounding Reference Signal
SSS Secondary Synchronization Signal
TDD Time Division Duplexing
TPC Transmit Power Control
TTI Transmission-Time Interval
TX transmission/transmitter, transmission-related
UE User Equipment
UL Uplink; generally referring to transmission of data to a node/into a direction closer to a network core (physically and/or logically); in particular from a D2D enabled node or UE to a base station or eNodeB; in the context of D2D, it may refer to the spectrum/bandwidth utilized for transmitting in D2D, which may be the same used for UL communication to a eNB in cellular communication; in some D2D variants, transmission by all devices involved in D2D communication may in some variants generally be in UL spectrum/bandwidth/carrier/frequency; generally, UL may refer to transmission by a terminal (e.g. to a network or network node or another terminal, for example in a D2D context).

These and other abbreviations may be used according to LTE standard definitions.

It may be considered that a HARQ signaling format comprises and/or determines and/or defines a modulation and/or number of symbols and/or a coding, e.g. for a HARQ transmission, e.g. to be utilized and/or which is utilized for HARQ transmission (e.g. for modulating and/or coding HARQ information and/or HARQ data, for example ACK/NACK and/or corresponding HARQ identifiers), in particular to be used by a terminal and/or UE (for encoding) and/or a network node (for decoding). It should be noted that for each coding, there may be an encoding and a corresponding decoding, which may be associated to each other in a reversible manner, such that encoded data may be decoded (and vice versa) in a reproducible and reversible manner (the latter possibly within a given probability of error) such that decoded data corresponds to the data encoded. Generally, a HARQ signaling format may determine and/or define and/or indicate the number of bits a HARQ data block (after modulating and/or encoding the HARQ data to be transmitted within a block) contains.

Coding may comprise error detection coding and/or forward error correction coding (which may also be referred to as channel coding or channel encoding). Coding may generally comprise encoding (e.g., by a UE and/or a corresponding module of the UE) and/or decoding (e.g., by a network node and/or a corresponding module of the node). Encoding in particular may pertain to HARQ data or information, which may comprise ACK/NACK signaling (e.g., one or more ACK/NACK bits) and/or corresponding identifiers, e.g. a HARQ process identifier. Such data or information may comprise channel state information or channel quality information and/or information pertaining to measurements performed by the terminal, e.g. encoded (coded) into a common block of data (e.g. a transport block or block of HARQ information or HARQ data or HARQ data block), Coding HARQ information may generally be performed by a terminal or UE, decoding HARQ information may be performed by a network node. To a coding (in particular encoding), a number of encoding bits (which may be called coding size or coding length) may be associated. For decoding, the decoding node (e.g. network node) may assume a format or coding, e.g. based on DL carrier number and/or a configuration provided to the encoding node, e.g. terminal or UE (the terminal or UE may generally be adapted to acknowledge receipt of a configuration to the configuring node, e.g. network node).

There may be considered a network node adapted for performing any one of the methods for operating a network node described herein and/or for configuring a terminal as described herein.

There may be considered a terminal adapted for performing any one of the methods for operating a terminal described herein, in particular according to a configuration configured by a network or network node or system.

There is also disclosed a program product comprising code executable by control circuitry, the code causing the control circuitry to carry out and/or control any one of the method for operating a terminal or network node as described herein, in particular if executed on control circuitry, which may be control circuitry of a terminal or a network node as described herein.

Moreover, there is disclosed a storage medium or carrier medium carrying and/or storing at least any one of the program products described herein and/or code executable by control circuitry, the code causing the control circuitry to perform and/or control at least any one of the methods described herein. Generally, a carrier medium may be accessible and/or readable and/or receivable by control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry, and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

An uplink carrier may generally be or indicate a carrier and/or frequency band intended and/or used for uplink transmissions.

A downlink carrier may generally be or indicate a carrier and/or frequency band intended and/or used for downlink transmissions.

A terminal being configured with a cell and/or carrier may be in a state in which it may communicate (transmit and/or receive data) using the cell or carrier, e.g. being registered with the network for communication and/or being synchronized to the cell and/or carrier.

Generally, a node being connected or connectable to a terminal with and/or via a cell or carrier may be adapted for communicating and/or communicate with the terminal using this cell or carrier and/or comprise a corresponding communication link. A terminal being connected or connectable to a network with a cell or carrier may be adapted for communicating and/or communicate with the terminal using this cell or carrier. Connection to a network may refer to connection to at least one node of the network.

Data may refer to any kind of data, in particular any one of and/or any combination of control data or user data or payload data. Control data may refer to data controlling and/or scheduling and/or pertaining to the process of data transmission and/or the network or terminal operation.

Receiving or transmitting on a cell or carrier may refer to receiving or transmitting utilizing a frequency (band) or spectrum associated to the cell or carrier.

A wireless communication network may comprise at least one network node, in particular a network node as described herein. A terminal connected or communicating with a network may be considered to be connected or communicating with at least one network node, in particular any one of the network nodes described herein.

In the context of this description, wireless communication may be communication, in particular transmission and/or reception of data, via electromagnetic waves and/or an air interface, in particular radio waves, e.g. in a wireless communication network and/or utilizing a radio access technology (RAT). The communication may involve one or more than one terminal connected to a wireless communication network and/or more than one node of a wireless communication network and/or in a wireless communication network. It may be envisioned that a node in or for communication, and/or in, of or for a wireless communication network is adapted for communication utilizing one or more RATs, in particular LTE/E-UTRA. A communication may generally involve transmitting and/or receiving messages, in particular in the form of packet data. A message or packet may comprise control and/or configuration data and/or payload data and/or represent and/or comprise a batch of physical layer transmissions. Control and/or configuration data may refer to data pertaining to the process of communication and/or nodes and/or terminals of the communication. It may, e.g., include address data referring to a node or terminal of the communication and/or data pertaining to the transmission mode and/or spectral configuration and/or frequency and/or coding and/or timing and/or bandwidth as data pertaining to the process of communication or transmission, e.g. in a header.

Each node or terminal involved in communication may comprise radio circuitry and/or control circuitry and/or antenna circuitry, which may be arranged to utilize and/or implement one or more than one radio access technologies. Radio circuitry of a node or terminal may generally be adapted for the transmission and/or reception of radio waves, and in particular may comprise a corresponding transmitter and/or receiver and/or transceiver, which may be connected or connectable to antenna circuitry and/or control circuitry. Control circuitry of a node or terminal may comprise a controller and/or memory arranged to be accessible for the controller for read and/or write access. The controller may be arranged to control the communication and/or the radio circuitry and/or provide additional services. Circuitry of a node or terminal, in particular control circuitry, e.g. a controller, may be programmed to provide the functionality described herein. A corresponding program code may be stored in an associated memory and/or storage medium and/or be hardwired and/or provided as firmware and/or software and/or in hardware. A controller may generally comprise a processor and/or microprocessor and/or microcontroller and/or FPGA (Field-Programmable Gate Array) device and/or ASIC (Application Specific Integrated Circuit) device. More specifically, it may be considered that control circuitry comprises and/or may be connected or connectable to memory, which may be adapted to be accessible for reading and/or writing by the controller and/or control circuitry.

Generally, control circuitry may be referred to, and/or implemented as, processing circuitry.

Radio access technology may generally comprise, e.g., Bluetooth and/or Wi-Fi and/or WIMAX and/or cdma2000 and/or GERAN and/or UTRAN and/or in particular E-Utran and/or LTE. A communication may in particular comprise a physical layer (PHY) transmission and/or reception, onto which logical channels and/or logical transmission and/or receptions may be imprinted or layered.

A node of a wireless communication network may be implemented as a terminal and/or user equipment and/or base station and/or relay node and/or any device generally adapted for communication in a wireless communication network, in particular cellular communication.

A wireless communication or cellular network may comprise a network node, in particular a radio network node, which may be connected or connectable to a core network, e.g. a core network with an evolved network core, e.g. according to LTE. A network node may e.g. be a base station. The connection between the network node and the core network/network core may be at least partly based on a cable/landline connection. Operation and/or communication and/or exchange of signals involving part of the core network, in particular layers above a base station or eNB, and/or via a predefined cell structure provided by a base station or eNB, may be considered to be of cellular nature or be called cellular operation. Operation and/or communication and/or exchange of signals without involvement of layers above a base station and/or without utilizing a predefined cell structure provided by a base station or eNB, may be considered to be D2D communication or operation, in particular, if it utilises the radio resources, in particular carriers and/or frequencies, and/or equipment (e.g. circuitry like radio circuitry and/or antenna circuitry, in particular transmitter and/or receiver and/or transceiver) provided and/or used for cellular operation.

A terminal may be implemented as a mobile terminal and/or user equipment. A terminal or a user equipment (UE) may generally be a device configured for wireless device-to-device communication and/or a terminal for a wireless and/or cellular network, in particular a mobile terminal, for example a mobile phone, smart phone, tablet, PDA, etc. A user equipment or terminal may be a node of or for a wireless communication network as described herein, e.g. if it takes over some control and/or relay functionality for another terminal or node. It may be envisioned that terminal or a user equipment is adapted for one or more RATs, in particular LTE/E-UTRA. A terminal or user equipment may generally be proximity services (ProSe) enabled, which may mean it is D2D capable or enabled. It may be considered that a terminal or user equipment comprises radio circuitry and/control circuitry for wireless communication. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. It may be considered that a terminal or user equipment is configured to be a terminal or user equipment adapted for LTE/E-UTRAN. Generally, a terminal may be adapted for MTC (machine-type communication) and/or M2M communication. Such a terminal may for example be implemented as or associated to a sensor/sensor arrangement and/or smart device and/or lighting/lighting arrangement and/or remotely controlled and/or monitored device (e.g., smart-meter), and/or be implemented as any other kind of device or machine connected or connectable to the network, in particular as a low cost device and/or allowing significant signaling delays.

A network node may be a base station, which may be any kind of base station of a wireless and/or cellular network adapted to serve one or more terminals or user equipments. It may be considered that a base station is a node or network node of a wireless communication network. A network node or base station may be adapted to provide and/or define and/or to serve one or more cells of the network and/or to allocate frequency and/or time resources for communication to one or more nodes or terminals of a network. Generally, any node adapted to provide such functionality may be considered a base station. It may be considered that a base station or more generally a network node, in particular a radio network node, comprises radio circuitry and/or control circuitry for wireless communication. It may be envisioned that a base station or network node is adapted for one or more RATs, in particular LTE/E-UTRA.

Radio circuitry may comprise for example a receiver or receiver device and/or transmitter or transmitter device and/or transceiver or transceiver device. Control circuitry or processing circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry.

A base station may be arranged to be a node of a wireless communication network, in particular configured for and/or to enable and/or to facilitate and/or to participate in cellular communication, e.g. as a device directly involved or as an auxiliary and/or coordinating node. Generally, a base station may be arranged to communicate with a core network and/or to provide services and/or control to one or more user equipments and/or to relay and/or transport communications and/or data between one or more user equipments and a core network and/or another base station and/or be Proximity Service enabled. An eNodeB (eNB) may be envisioned as an example of a base station, e.g. according to an LTE standard. A base station may generally be proximity service enabled and/or to provide corresponding services. It may be considered that a base station is configured as or connected or connectable to an Evolved Packet Core (EPC) and/or to provide and/or connect to corresponding functionality. The functionality and/or multiple different functions of a base station may be distributed over one or more different devices and/or physical locations and/or nodes. A base station may be considered to be a node of a wireless communication network. Generally, a base station may be considered to be configured to be a coordinating node and/or to allocate resources in particular for cellular communication between two nodes or terminals of a wireless communication network, in particular two user equipments.

It may be considered for cellular communication there is provided at least one uplink (UL) connection and/or channel and/or carrier and at least one downlink (DL) connection and/or channel and/or carrier, e.g. via and/or defining a cell, which may be provided by a network node, in particular a base station or eNodeB. An uplink direction may refer to a data transfer direction from a terminal to a network node, e.g. base station and/or relay station. A downlink direction may refer to a data transfer direction from a network node, e.g. base station and/or relay node, to a terminal. UL and DL may be associated to different frequency resources, e.g. carriers and/or spectral bands. A cell may comprise at least one uplink carrier and at least one downlink carrier, which may have different frequency bands. A network node, e.g. a base station or eNodeB, may be adapted to provide and/or define and/or control one or more cells, e.g. a PCell and/or a LA cell.

A network node, in particular a base station, and/or a terminal, in particular a UE, may be adapted for communication in spectral bands (frequency bands) licensed and/or defined for LTE. In addition, a network node, in particular a base station/eNB, and/or a terminal, in particular a UE, may be adapted for communication in freely available and/or unlicensed/LTE-unlicensed spectral bands (frequency bands), e.g. around 5 GHz.

Configuring a terminal or wireless device or node may involve instructing and/or causing the wireless device or node to change its configuration, e.g. at least one setting and/or register entry and/or operational mode. A terminal or wireless device or node may be adapted to configure itself, e.g. according to information or data in a memory of the terminal or wireless device. Configuring a node or terminal or wireless device by another device or node or a network may refer to and/or comprise transmitting information and/or data and/or instructions to the wireless device or node by the other device or node or the network, e.g. allocation data and/or scheduling data and/or scheduling grants and/or a configuration. Configuring a terminal may include sending allocation data to the terminal indication which modulation and/or encoding to use. A terminal may be configured with and/or for scheduling data and/or to use, e.g. for transmission, scheduled and/or allocated uplink resources, and/or, e.g. for reception, scheduled and/or allocated downlink resources. Uplink resources and/or downlink resources may be scheduled and/or provided with allocation or configuration data.

A wireless communication network may comprise a radio access network (RAN), which may be adapted to perform according to one or more standards, in particular LTE, and/or radio access technologies (RAT).

A network device or node and/or a wireless device may be or comprise a software/program arrangement arranged to be executable by a hardware device, e.g. control circuitry, and/or storable in a memory, which may provide the described functionality and/or corresponding control functionality.

A cellular network or mobile or wireless communication network may comprise e.g. an LTE network (FDD or TDD), UTRA network, CDMA network, WiMAX, GSM network, any network employing any one or more radio access technologies (RATs) for cellular operation. The description herein is given for LTE, but it is not limited to the LTE RAT.

RAT (radio access technology) may generally include: e.g. LTE FDD, LTE TDD, GSM, CDMA, WCDMA, Wi-Fi, WLAN, WiMAX, etc.

A storage medium may be adapted to store data and/or store instructions executable by control circuitry and/or a computing device, the instruction causing the control circuitry and/or computing device to carry out and/or control any one of the methods described herein when executed by the control circuitry and/or computing device. A storage medium may generally be computer-readable, e.g. an optical disc and/or magnetic memory and/or a volatile or non-volatile memory and/or flash memory and/or RAM and/or ROM and/or EPROM and/or EEPROM and/or buffer memory and/or cache memory and/or a database.

Resources or communication resources or radio resources may generally be frequency and/or time resources (which may be called time/frequency resources). Allocated or scheduled resources may comprise and/or refer to frequency-related information, in particular regarding one or more carriers and/or bandwidth and/or subcarriers and/or time-related information, in particular regarding frames and/or slots and/or subframes, and/or regarding resource blocks and/or time/frequency hopping information. Allocated resources may in particular refer to UL resources, e.g. UL resources for a first wireless device to transmit to and/or for a second wireless device. Transmitting on allocated resources and/or utilizing allocated resources may comprise transmitting data on the resources allocated, e.g. on the frequency and/or subcarrier and/or carrier and/or timeslots or subframes indicated. It may generally be considered that allocated resources may be released and/or de-allocated. A network or a node of a network, e.g. an allocation or network node, may be adapted to determine and/or transmit corresponding allocation data indicating release or de-allocation of resources to one or more wireless devices, in particular to a first wireless device.

Allocation data may be considered to be data scheduling and/or indicating and/or granting resources allocated by the controlling or allocation node, in particular data identifying or indicating which resources are reserved or allocated for communication for a wireless device or terminal and/or which resources a wireless device or terminal may use for communication and/or data indicating a resource grant or release, in particular pertaining to uplink and/or downlink resources. A grant or resource or scheduling grant or scheduling data (which, in particular, may pertain to information regarding and/or representing and/or indicating scheduling of resources) may be considered to be one example of allocation data. Allocation data may in particular comprise information and/or instruction regarding a configuration and/or for configuring a terminal, e.g. indicating a scheduling and/or a modulation to use, which may comprise an encoding and/or a number of symbols Q' to be used. Such information may comprise e.g. information about which carriers (and/or respective HARQ feedback) to bundle, bundle size, method to bundle (e.g. which operations to perform, e.g. logical operations), etc., in particular information pertaining to and/or indicating the variants and methods described herein. It may be considered that an allocation node or network node is adapted to transmit allocation data directly to a node or wireless device and/or indirectly, e.g. via a relay node and/or another node or base station. Allocation data may comprise control data and/or be part of or form a message, in particular according to a pre-defined format, for example a DCI format, which may be defined in a standard, e.g. LTE. Allocation data may comprise configuration data (and/or pertain to a configuration), which may comprise instruction to configure and/or set a user equipment for a specific operation mode, e.g. in regard to the use of receiver and/or transmitter and/or transceiver and/or use of transmission (e.g. TM) and/or reception mode, and/or may comprise scheduling data, e.g. granting resources and/ or indicating resources to be used for transmission and/or reception. A scheduling assignment may be considered to represent scheduling data and/or be seen as an example of allocation data. A scheduling assignment may in particular refer to and/or indicate resources to be used for communication or operation.

HARQ ACK/NACK (acknowledge for a correctly received block of data, not acknowledged for a not correctly received block of data) feedback may refer to feedback (e.g. a corresponding signal transmitted, which may comprise 1 or more bits) provided (e.g. on the UL) by a terminal, e.g. to a network or network node in response to data transmitted to it (e.g. on the DL). HARQ ACK//NACK information or feedback (or shorter HARQ-ACK information or feedback or HARQ information or feedback or just HARQ) may include transmitting a signal/bot indicating whether a transport block of data received by the terminal has been receiver correctly or not. HARQ and/or determining HARQ may include decoding and/or error detection procedures to determine correct reception. There may be defined a number of HARQ processes with associated HARQ ids or numbers, which may refer to individual data streams; a HARQ response or feedback from a terminal (e.g. a HARQ bit) may be associated to one of the HARQ processes or ids. In some variant, HARQ feedback may comprise one bit per DL carrier; in other variant, HARQ feedback may comprise two (or more than two) bits per carrier, e.g. dependent on the rank used. Generally, HARQ feedback may be transmitted (and/or determined, e.g. based on received signals and/or transport blocks and/or data and/or HARQ process identifiers) by a terminal, and/or a terminal may be adapted for, and/or comprise a HARQ module for, determining (e.g., as mentioned above) and/or transmitting HARQ feedback, in particular based on and/or using a configuration and/or a modulation configured, e.g. a modulation determined and/or configured as described herein. Transmitting HARQ may generally be performed on a UL control channel, e.g. PUSCH.

A coding type and/or code and/or corresponding algorithm may be for error detection coding or channel coding. A coding type for channel coding may in particular be a convolutional code or turbo code or RM code A wireless device may generally be a terminal, e.g. a user equipment. An uplink resource may be a resource scheduled and/or used for uplink transmission, e.g., by a terminal, and/or for reception of such transmission, e.g. by a network node or base station. A downlink resource may be a resource scheduled and/or used for downlink transmission, e.g. by a base station or network node, and/or for reception of such transmission, e.g. by a terminal.

A channel may generally be a physical channel, in particular a control channel, e.g. PUCCH. A control channel may be used for and/or carry control information, an uplink control channel for example uplink control information.

Data and/or information may generally be transmitted and/or received as signal/s, which may be carried on a time-frequency resource and/or carrier and/or subcarrier.

A terminal may generally be adapted for transmission and/or reception with a RF bandwidth of 1.4 MHz and/or supporting a channel bandwidth of 6 PRBs a 180 kHz, e.g. for cost/complexity savings, in particular pertaining to control information like uplink control information and/or using an uplink control channel like PUCCH (which may be called LC control channel, or in particular LC-PUCCH, if associated and/or carried on such a channel/bandwidth. This may be in addition or instead of the terminal being adapted for transmission and/or reception at a larger system bandwidth than 1.4 MHz. A thus adapted terminal may be called narrowband and/or low-complexity (LC) terminal or UE (also referred to as terminal or LC terminal herein).

The invention claimed is:

1. A terminal for a Radio Access Network, the terminal being adapted for transmitting Uplink Control Information, UCI, wherein transmitting UCI comprises repeating the UCI for a number of Physical Uplink Control Channel, PUCCH, repetitions, the number of PUCCH repetitions being determined based on a Random Access Channel Coverage Enhancement Level, RACH CE level, wherein the number of PUCCH repetitions are determined based on a mapping according to a Physical Random Access Channel Coverage Enhancement Level, PRACH CE level, used in a last PRACH attempt, wherein:

responsive to PRACH CE level 0 or 1 being used for the last PRACH attempt, the number of repetitions are according to CE mode A, or responsive to PRACH CE level 2 or 3 being used for the last PRACH attempt, the number of repetitions are according to CE mode B.

2. A method for operating a terminal in a Radio Access Network, the method comprising transmitting Uplink Control Information, UCI, wherein transmitting UCI comprises repeating the Uplink Control Information for a number of Physical Uplink Control Channel, PUCCH, repetitions, the number of PUCCH repetitions being determined based on a Random Access Channel Coverage Enhancement Level, RACH CE level, wherein the number of PUCCH repetitions are determined based on a mapping according to a Physical Random Access Channel Coverage Enhancement Level, PRACH CE level, used in a last PRACH attempt, wherein:

responsive to PRACH CE level 0 or 1 being used for the last PRACH attempt, the number of repetitions are according to CE mode A, or responsive to PRACH CE level 2 or 3 being used for the last PRACH attempt, the number of repetitions are according to CE mode B.

3. A network node for a Radio Access Network, the network node being adapted for receiving Uplink Control Information, UCI, from one or more than one terminals, the UCI being repeated for a number of Physical Uplink Control Channel, PUCCH, repetitions, the number of PUCCH repetitions being determined based on a Random Access Channel Coverage Enhancement Level, RACH CE level, wherein the number of PUCCH repetitions are determined based on a mapping according to a Physical Random Access Channel Coverage Enhancement Level, PRACH CE level, used in a last PRACH attempt, wherein:

responsive to PRACH CE level 0 or 1 being used for the last PRACH attempt, the number of repetitions are according to CE mode A, or responsive to PRACH CE level 2 or 3 being used for the last PRACH attempt, the number of repetitions are according to CE mode B.

4. A method for operating a network node in a Radio Access Network, the method comprising receiving Uplink Control Information, UCI, from one or more than one terminals, the UCI being repeated for a number of Physical Uplink Control Channel, PUCCH, repetitions, the number of PUCCH repetitions being determined based on a Random Access Channel Coverage Enhancement Level, RACH CE level, wherein the number of PUCCH repetitions are determined based on a mapping according to a Physical Random Access Channel Coverage Enhancement Level, PRACH CE level, used in a last PRACH attempt, wherein:

responsive to PRACH CE level 0 or 1 being used for the last PRACH attempt, the number of repetitions are according to CE mode A, or responsive to PRACH CE level 2 or 3 being used for the last PRACH attempt, the number of repetitions are according to CE mode B.

5. A non-transitory computer readable medium comprising code executable by control circuitry of a terminal, the code causing the control circuitry to cause the terminal to transmit Uplink Control Information, UCI, wherein transmitting UCI comprises repeating the Uplink Control Information for a number of Physical Uplink Control Channel, PUCCH, repetitions, the number of PUCCH repetitions being determined based on a Random Access Channel Coverage Enhancement Level, RACH CE level, wherein the number of PUCCH repetitions are determined based on a mapping according to a Physical Random Access Channel Coverage Enhancement Level, PRACH CE level, used in a last PRACH attempt, wherein:

responsive to PRACH CE level 0 or 1 being used for the last PRACH attempt, the number of repetitions are according to CE mode A, or responsive to PRACH CE level 2 or 3 being used for the last PRACH attempt, the number of repetitions are according to CE mode B.

6. A non-transitory computer readable medium comprising code executable by control circuitry of a network node, the code causing the control circuitry to cause the network node to receive Uplink Control Information, UCI, from one or more than one terminals, the UCI being repeated for a number of Physical Uplink Control Channel, PUCCH, repetitions, the number of PUCCH repetitions being determined based on a Random Access Channel Coverage Enhancement Level, RACH CE level, wherein the number of PUCCH repetitions are determined based on a mapping according to a Physical Random Access Channel Coverage Enhancement Level, PRACH CE level, used in a last PRACH attempt, wherein:

responsive to PRACH CE level 0 or 1 being used for the last PRACH attempt, the number of repetitions are according to CE mode A, or responsive to PRACH CE level 2 or 3 being used for the last PRACH attempt, the number of repetitions are according to CE mode B.

* * * * *